(12) United States Patent
Kuramoto (10) Patent No.: US 8,724,114 B2
(45) Date of Patent: May 13, 2014

(54) INTERFEROMETER AND DISTANCE CALCULATION METHOD THEREFOR

(75) Inventor: Yoshiyuki Kuramoto, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 217 days.

(21) Appl. No.: 13/293,780

(22) Filed: Nov. 10, 2011

(65) Prior Publication Data

US 2012/0127477 A1   May 24, 2012

(30) Foreign Application Priority Data

Nov. 11, 2010   (JP) .................... 2010-252472

(51) Int. Cl.
*G01B 11/02* (2006.01)
*G01B 9/02* (2006.01)

(52) U.S. Cl.
USPC .......................................... 356/498; 356/486

(58) Field of Classification Search
USPC ........................ 356/486, 487, 493, 498, 517
See application file for complete search history.

(56) References Cited

U.S. PATENT DOCUMENTS

| | | | | |
|---|---|---|---|---|
| 4,907,886 A | * | 3/1990 | Dandliker | 356/487 |
| 6,525,825 B2 | * | 2/2003 | de Groot et al. | 356/517 |
| 7,420,689 B2 | * | 9/2008 | Bodermann | 356/517 |
| 7,898,669 B2 | * | 3/2011 | Kim et al. | 356/486 |
| 8,339,611 B2 | * | 12/2012 | Kuramoto | 356/486 |
| 8,456,642 B2 | * | 6/2013 | Sugiura | 356/498 |
| 8,477,316 B2 | * | 7/2013 | Holzapfel | 356/498 |

FOREIGN PATENT DOCUMENTS

| | | | |
|---|---|---|---|
| JP | 7-81819 B | | 9/1995 |
| JP | 11044504 A | * | 2/1999 |

* cited by examiner

*Primary Examiner* — Michael A Lyons
(74) *Attorney, Agent, or Firm* — Canon USA Inc. IP Division (57) ABSTRACT

A method of calculating a geometrical distance of a test optical path on the basis of interfering a test beam and a reference beam includes an optical-path-length calculating step of calculating an optical path length of the test optical paths having different wavelengths by using the interfering beam having mutually different wavelengths, a refractive-index calculating step of calculating the refractive index of the test optical path on the basis of the optical path length of the test optical path calculated by the optical-path-length calculating step, a smoothing step of smoothing a plurality of refractive indices acquired by repeating the optical-path-length calculating step and the refractive-index calculating step to calculate a smoothed refractive index, and a geometrical distance calculating step of calculating the geometrical distance of the test optical path on the basis of the smoothed refractive index calculated by the smoothing step.

9 Claims, 6 Drawing Sheets

INTERFEROMETER AND DISTANCE CALCULATION METHOD THEREFOR

BACKGROUND OF THE INVENTION

1. Field of the Invention

The present invention relates to a calculation method and an interferometer which calculates the geometrical distance of a test optical path on the basis of the optical path length of the test optical path.

2. Description of the Related Art

A well-known problem in the field of interferometric metrology involves the accurate measurement of distances. Hitherto, a distance measurement method has been well known which is based on interferometric measurement. In its simplest form, an interferometric measurement includes interfering a reference beam with a test beam and obtaining an optical path difference (OPD) between the two beams by analyzing an interference pattern (fringes). The fringes are formed by interfering the reference beam reflected by a reference surface functioning as a length-measurement reference and the test beam reflected by a test surface attached to an object whose distance or surface profile is desired to be measured. Calculation of the OPD is generally based on the phase and wavelength of the interfering beams. However, since the refractive index in the air varies in accordance with the temperature, pressure, humidity and so on, the wavelength on which the measurement is based may vary. Accordingly, the distance measurement in the air may require correction of the refractive-index with high precision.

Two refractive-index correction methods are roughly available. One method measures a refractive index at one point and applies the refractive index measured value to the entire test optical path. This method is generally well used but assumes that the refractive index is even between the refractive index measurement point and the test optical path. For high-precision refractive index correction, a high-precision air conditioner may be required. Another method uses a refractive index dispersion in which a refractive index depends on the wavelength of light to measure the refractive index and the distance at the same time. This method is known as the Two-Color method because two or more wavelengths are used to measure an optical path length. The Two-Color method allows measurement of an average refractive index of a test optical path and reduces the influence of the refractive index dispersion in the air and allows measurement of a refractive index with high precision. However, a problem exists that the measurement resolution decreases by the variance ratio of a refractive index called A coefficient. A method using a moving average has been known in order to solve the problem of the Two-Color method. According to the method described in Japanese Patent Publication No. 7-81819, the moving average in Expression (1) below is used to calculate a length measurement value L to improve the resolution.

$$\begin{cases} L = OPL_1 - A \cdot \left( \dfrac{1}{N} \sum\limits_{j=1}^{N} OPL_{1j} - \dfrac{1}{N} \sum\limits_{j=1}^{N} OPL_{2j} \right) \\ A = \dfrac{K(\lambda_1) - 1}{K(\lambda_1) - K(\lambda_2)} \end{cases} \quad (1)$$

Here, $OPL_{1j}$ and $OPL_{2j}$ are the jth optical path lengths measured with a first wavelength $\lambda_1$ and a second wavelength $\lambda_2$, respectively, N is the number of times of moving average, and $K(\lambda)$ is a refractive index dispersion term of dry air.

However, the method described in Japanese Patent Publication No. 7-81819 performs moving average not only on a refractive index but also on a component that depends on a geometrical distance which is the measurement result. For that reason, when an object is driven, the moving average is performed on data including a past driven distance, which delays the response speed and may cause a length measurement error.

SUMMARY OF THE INVENTION

The present invention provides a calculation method and interferometer which may reduce the delay of a response speed in interferometric measurement and may implement high-precision refractive index correction with reduced length measurement errors.

An interferometric method of the present invention is a calculation method which calculates the geometrical distance of a test optical path on the basis of interfering beam between a test beam reflected by a test surface and a reference beam reflected by a reference surface, the method including an optical-path-length calculating step of calculating an optical path length of the test optical paths having different wavelengths by using the interfering beams having mutually different wavelengths, a refractive-index calculating step of calculating the refractive index of the test optical path on the basis of the optical path length of the test optical path calculated by the optical-path-length calculating step, a smoothing step of smoothing a plurality of refractive indices acquired by repeating the optical-path-length calculating step and the refractive-index calculating step to calculate a smoothed refractive index, and a geometrical distance calculating step of calculating the geometrical distance of the test optical path on the basis of the smoothed refractive index calculated by the smoothing step.

Further features of the present invention will become apparent from the following description of exemplary embodiments with reference to the attached drawings.

DESCRIPTION OF THE EMBODIMENTS

Embodiments of the present invention will be described in detail with reference to the attached drawings.

First Embodiment

Figure 1:
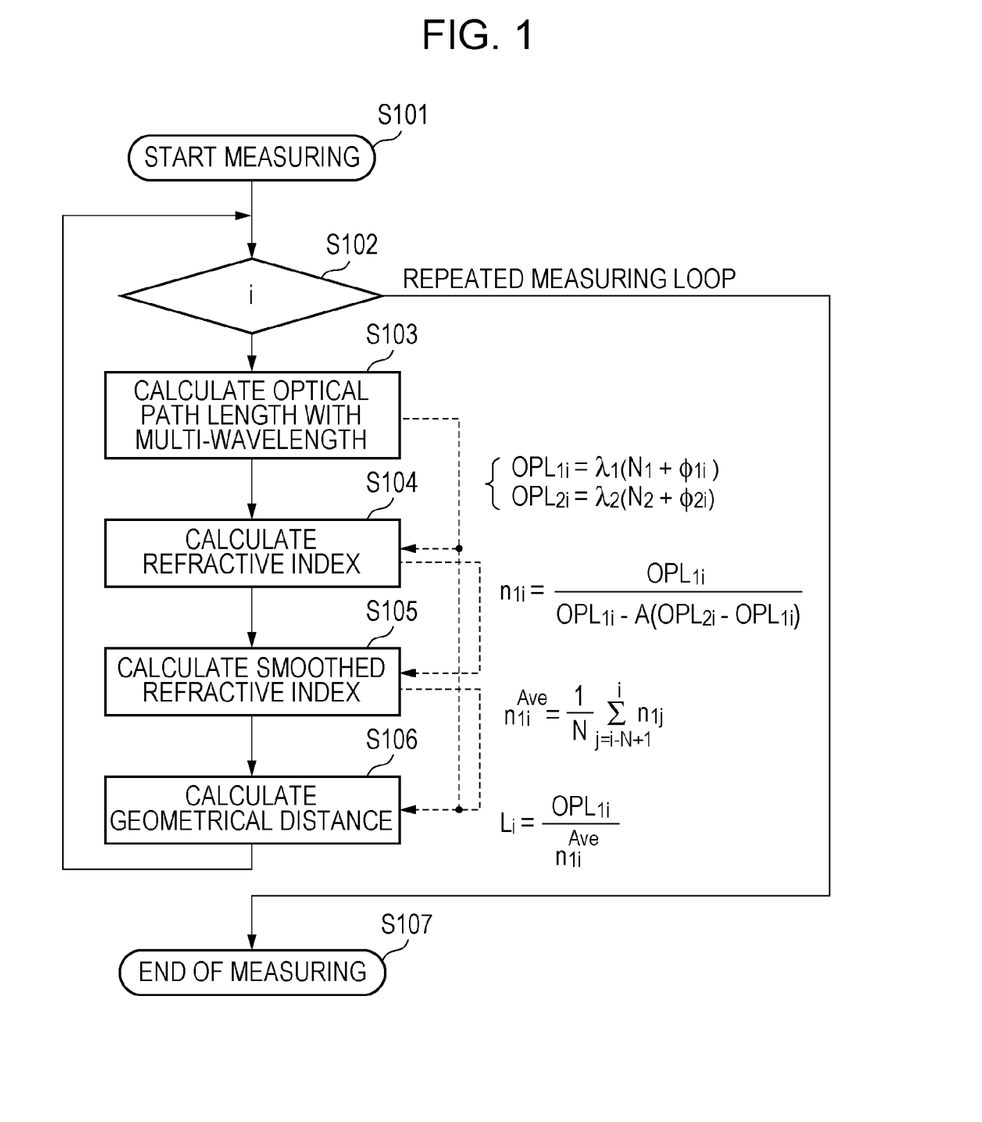
FIG. 1 is a flowchart of an interferometric method according to a first embodiment.
Figure 2:
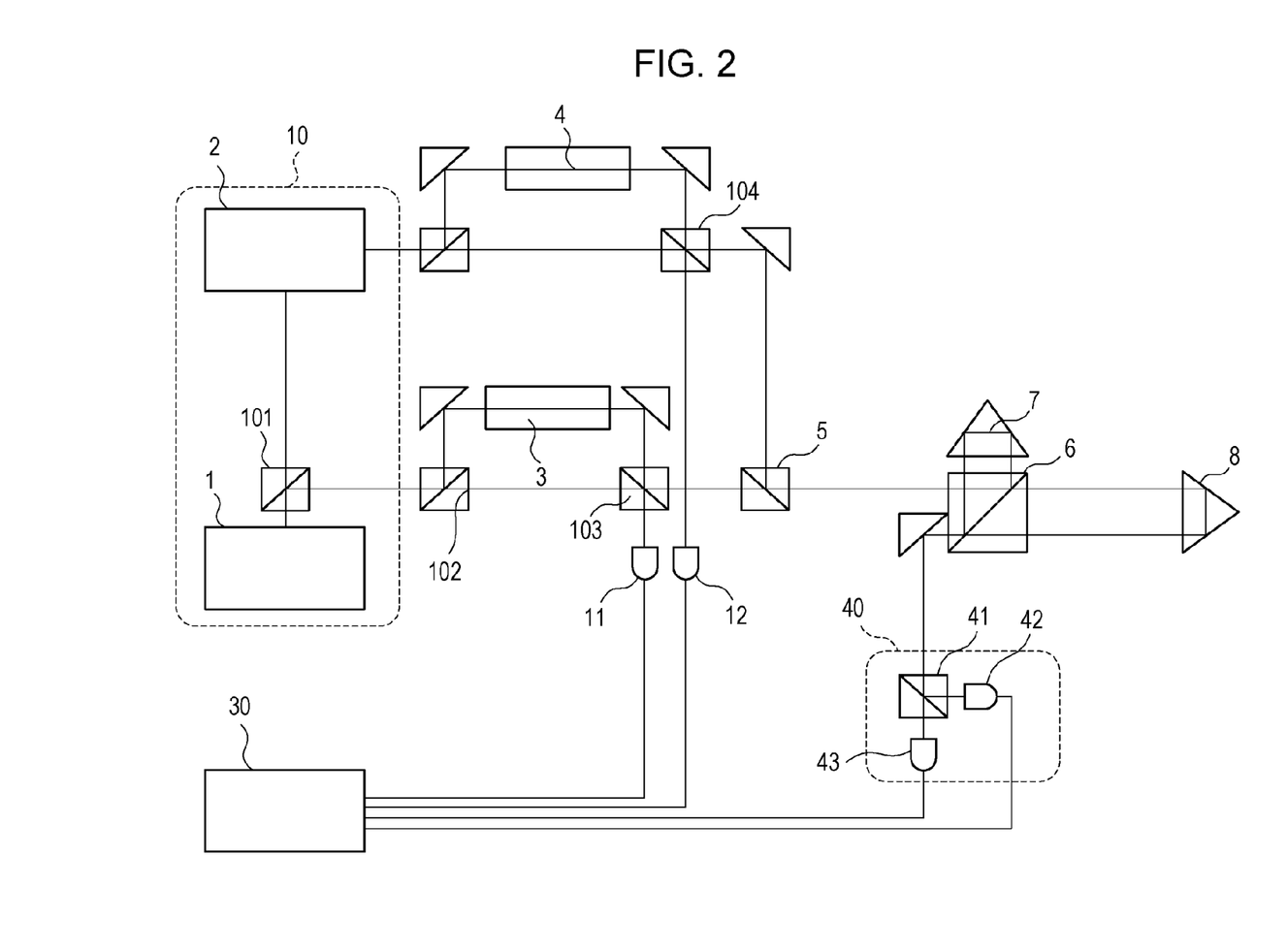
FIG. 2 illustrates an interferometer of the first embodiment.

With reference to FIG. 1 and FIG. 2, an interferometric method and apparatus of a first embodiment will be described. FIG. 1 is a flowchart of an interferometric method according to a first embodiment. FIG. 2 illustrates the configuration of an interferometer.

A flow of the interferometric method of this embodiment illustrated in FIG. 1 will be described. If the measurement is started in step S101, the repeated measurement loop is executed in step S102. In step S103, mutually different two or more kinds of multi-wavelengths are used to measure the optical path length between the interferometer and an object. In step S104, the refractive index of the air is calculated from the measured optical path length. In step S105, a smoothed refractive index is calculated. In step S106, from the measured optical path length and the calculated refractive index of the air, the geometrical distance between the interferometer and the object is calculated.

The present invention provides a calculation method which calculates a geometrical distance including the aforementioned steps. According to the present invention, the geometrical distance refers to a distance from an interferometer to an object and also refers to an optical path length where the refractive index is equal to 1.

With reference to FIG. 2, an interferometer will be described. A beam (hereinafter called a fundamental beam) that is emitted from a light source 1 having a single frequency spectrum is divided by a beam splitter 101 into two beams. One of the divided beams proceeds to a second harmonic beam generating unit 2. The second harmonic beam generating unit 2 uses a nonlinear optical element to generate and output a second beam having half wavelength of the light source 1 (hereinafter called a second harmonic beam). Though the case where a beam having the half wavelength of the fundamental beam is generated will be described below, a beam having other wavelengths may be generated. The second harmonic beam generating unit 2 may contain periodically poled lithium niobate (PPLN), which may save the cost and space. However, PPLN limits the usable transparent wavelength bands. Instead of PPLN, providing an external cavity or providing a nonlinear optical crystal within a cavity for the light source 1 may implement the wavelength conversion. Compared with the case using PPLN, the apparatus configuration may be complicated, but a transparent wavelength band that is equal to or lower than the transparent wavelength band for PPLN may be used. The structure including the light source 1, the second harmonic beam generating unit 2 and the beam splitter 101 will be called a multi-wavelength light source 10.

A fundamental beam (first beam) that is emitted by the multi-wavelength light source 10 in the other beam of the beam divided by the beam splitter 101 is divided into two by a beam splitter 102. One of the divided beam launches on a frequency shift unit 3. Hereinafter, among the fundamental beams emitted from the multi-wavelength light source 10, a beam passing through the frequency shift unit 3 will be called a fundamental beam frequency-shifted beam, and a beam not passing through the frequency shift unit 3 will be called a fundamental beam. The frequency shift unit 3 shifts the frequency of the incident beam by df and then performs polarization rotation in orthogonal to the incident polarized light. The frequency shift is performed by an acousto-optic element (AOM). The amount of frequency shift may be arbitrary and is controlled with high precision by a reference oscillator, not illustrated. The fundamental frequency-shifted beam output by the frequency shift unit 3 is multiplexed with a fundamental beam and is divided into two by the beam splitter 103. One of the divided beam launches on a fundamental beam reference signal detector 11 and generates an interference signal $I_{ref}(\lambda_1)$ described by Expression (2).

$$I_{ref}(\lambda_1) = I_1 \cos\left(2\pi\left(df \cdot t + \frac{OPD_1(\lambda_1)}{\lambda_1}\right)\right) \quad (2)$$

In this case, $I_1$ is a modulated component of an interference signal intensity, $\lambda_1$ is a vacuum wavelength of a fundamental beam, $OPD_1(\lambda_1)$ is an optical path length difference between a fundamental frequency-shifted beam before reaching the fundamental beam reference signal detector 11 and a fundamental beam. The interference signal $I_{ref}(\lambda_1)$ is signal-processed by an analyzer 30.

From the second harmonic beam that has been emitted from the multi-wavelength light source 10, like the fundamental beam, a second harmonic frequency-shift unit 4 is used to generate an interference signal $I_{ref}(\lambda_2)$ described by Expression (3).

$$I_{ref}(\lambda_2) = I_2 \cos\left(2\pi\left(df \cdot t + \frac{OPD_2(\lambda_2)}{\lambda_2}\right)\right) \quad (3)$$

The amount of frequency shift may be arbitrary but may be an equal amount of shift to that of the fundamental beam for easy signal processing. In this case, the interference signal $I_{ref}(\lambda_2)$ is detected by a second harmonic reference signal detector 12, $I_2$ is a modulated component of an interference signal intensity, $\lambda_2$ is a vacuum wavelength of a second harmonic beam, and $OPD_2(\lambda_2)$ is an optical path length difference between a second harmonic frequency-shifted beam before reaching the second harmonic beam reference signal detector 12 and the second harmonic beam. The interference signal detected by the second harmonic reference signal detector 12 is signal-processed by the analyzer 30.

A beam of the fundamental beam which has passed through the beam splitter 103 and launched on a dichroic mirror 5 is multiplexed with a beam of the second harmonic beam which has passed through the beam splitter 104 and launched on the dichroic mirror 5 and launches on a polarized beam splitter (PBS) 6. The fundamental frequency-shifted beam and the fundamental beam and the second harmonic frequency-shifted beam and the second harmonic beam have mutually orthogonal polarized light beams. Accordingly, the PBS 6 is arranged to reflect only the fundamental frequency-shifted beam and second harmonic frequency-shifted beam and allow the fundamental beam and second harmonic beam to pass through. The beam reflected by the PBS 6 is reflected by a reference surface 7 having a corner cube and then launches on the PBS 6 and is reflected again. The fundamental beam and second harmonic beam passed through the PBS 6 are reflected by a test surface 8 having a corner cube and again pass through the PBS 6 and are multiplexed with the fundamental frequency-shifted beam and second harmonic frequency-shifted beam.

Hereinafter, beams reflected by the PBS 6 will collectively be called a reference beam, and beams passing through the PBS 6 will be called a test beam. The PBS 6 and reference surface 7 are attached to a reference structure for length measurement. The test surface 8 is attached to a object of the length measurement. In particular, the test surface 8 may not be provided in the interferometer, the test surface 8 which reflects the test beam to a object of the length measurement may be attached to the interferometer.

From the beam multiplexed after passing through the PBS 6, an interference signal detector 40 detects an interference signal. The interference signal detector 40 includes a dichroic mirror 41, a fundamental measurement signal detector 43, and a second harmonic measurement signal detector 42. The beam is divided by the dichroic mirror 41 into a fundamental beam and a second harmonic beam from which interference signals are detected by the fundamental measurement signal detector 43 and the second harmonic measurement signal detector 42, respectively. The interference signal $I_{meas}(\lambda_1)$ detected by the fundamental measurement signal detector 43 and the interference signal $I_{meas}(\lambda_2)$ detected by the second harmonic measurement signal detector 42 are described by Expression (4) and Expression (5), respectively.

$$I_{meas}(\lambda_1) = I_3 \cos\left(2\pi\left(df \cdot t + \frac{OPD_1(\lambda_1)}{\lambda_1} + \frac{n(\lambda_1)L}{\lambda_1}\right)\right) \quad (4)$$

$$I_{meas}(\lambda_2) = I_4 \cos\left(2\pi\left(df \cdot t + \frac{OPD_2(\lambda_2)}{\lambda_2} + \frac{n(\lambda_2)L}{\lambda_2}\right)\right) \quad (5)$$

where L is the geometrical distance of the optical path difference between a reference beam and a test beam, $n(\lambda_1)$ and $n(\lambda_2)$ are refractive indices of the fundamental beam and second harmonic beam of the test optical path, respectively, I3 and I4 are modulated components of the interference signal intensities, and t is a measurement time.

The interference signals detected by the fundamental measurement signal detector 43 and second harmonic measurement signal detector 42 are signal-processed by the analyzer 30. The analyzer 30 calculates the geometrical distance L on the basis of the measured values of the fundamental reference signal detector 11, fundamental measurement signal detector 43, second harmonic reference signal detector 12, and second harmonic beam measurement signal detector 42.

A flow of an interferometric method to be performed within the analyzer 30 (operating unit) will be described below in detail with reference to FIG. 1.

The measurement is started in step S101, and advances to step S102. The repeated measurement loop is started in step S102 with a loop counting "i" until a user decides to end the measuring loop. Hereinafter, the subscript i refers to the measurement result of the ith measurement loop. (i is a positive integer) The measurement is repeated in the analyzer 30 until a user instructs to finish it. If instructed to finish, the measurement ends in step S107. In step S103, the fundamental optical path length $OPL_1$ and second harmonic optical path length $OPL_2$ of the optical path difference of the reference beam and test beam are calculated. Hereinafter, step S103 will be called a multi-wavelength optical-path-length calculating step. From the interference signals detected by the fundamental reference signal detector 11 and fundamental measurement signal detector 43, a phase meter not illustrated is first used to measure the phase difference $\phi_2$ between the fundamental reference signal described by Expression (2) and the fundamental measurement signal described by Expression (4). Similarly, from the interference signals detected by the second harmonic reference signal detector 12 and second harmonic measurement signal detector 42, the phase meter not illustrated is used to measure a phase difference $\phi_2$ between the second harmonic reference signal described by Expression (3) and the second harmonic measurement signal described by Expression (5). The optical path length is described by Expression (6).

$$\begin{cases} n(\lambda_1)L = OPL_{1i} = \lambda_1(N_1 + \phi_{1i}) \\ n(\lambda_2)L = OPL_{2i} = \lambda_2(N_2 + \phi_{2i}) \end{cases} \quad (6)$$

In this case, $N_1$ and $N_2$ are integers indicating interference orders. The initial values of the interference orders are determined by using an origin sensor placed at a reference position. After this point, the initial values are calculated by counting the increases and decreases of the interference orders by using an interference phase measurement history for each measurement loop.

In step S104, the refractive index of the air is measured from the optical path lengths of the fundamental beam and second harmonic beam. Step S104 will be called a refractive-index calculating step. Assuming that the medium of the optical path of the test beam is dry air and using the Two-Color method, the geometrical distance L of the optical path difference between the reference beam and the test beam is described by Expression (7). In this case, A is a coefficient called A coefficient which is determined from the refractive index dispersion $K(\lambda)$ and the measured wavelength of the air and is a value in the order of several tens with a normal measured wavelength. This value influences the geometrical distance. The A coefficient is expressed by the following Expression (7).

$$\begin{cases} L_i = OPL_{1i} - A(OPL_{2i} - OPL_{1i}) \\ A = \dfrac{K(\lambda_1) - 1}{K(\lambda_1) - K(\lambda_2)} \end{cases} \quad (7)$$

On the basis of Expression (7), the refractive index of the air on which the fundamental beam travels may be calculated by Expression (8).

$$n_{1i} = \frac{OPL_{1i}}{L_i} = \frac{OPL_{1i}}{OPL_{1i} - A(OPL_{2i} - OPL_{1i})} \quad (8)$$

In step S105, the refractive indices calculated in step S104 are smoothed. Moving average is used for the smoothing. Hereinafter, the refractive index acquired by smoothing such as moving average will be called a smoothed refractive index, and step S105 will be called a refractive-index smoothing step. The smoothed refractive index calculated by moving average on immediately preceding N samples of the ith measurement loop is described by Expression (9). Here, the value of N is called a moving average deviation.

$$n_{1i}^{Ave} = \frac{1}{N} \sum_{j=i-N+1}^{i} n_{1j} \quad (9)$$

By the way, one of known main factors that cause measurement errors by an interferometer is a cyclic error caused by the mix of an unnecessary beam into a test beam. For example, a beam reflected within a beam splitter may be detected as an unnecessary beam. The period of cyclic errors is an integral multiple and 1/integral multiple of a measured signal period. The amplitude is in the order of several nm. According to the Two-Color method, because the influence of a periodic error is amplified by the A coefficient, the error is to be corrected.

Accordingly, the number of average N to be used in Expression (9) may be determined by Expression (10) with a moving speed v of a test surface, a measurement interval $\Delta t$, a signal period $\Lambda$, and an integer m. Thus, the cyclic errors may be cancelled out each other and be corrected at the same time as the smoothing on the refractive indices. In a real operating environment, because the object speed varies, the number of averaging elements may be changed in accordance with the speed instantaneous value for effective periodic error correction. The signal period herein corresponds to the amount of driving an object corresponding to a phase difference $2\pi$ and is expressed as $\Lambda=\lambda/(2k)$ by using the number of reciprocations k on the test optical path by the interferometer. According to this embodiment, because a linear interferometer is used and the number of reciprocations is equal to 1, the signal period is equal to ½ of the wavelength.

$$N = \text{round}\left(\frac{m \cdot \Lambda}{v \cdot \Delta t}\right) \quad (10)$$

Having used simple moving average to smooth refractive indices according to this embodiment, other computing methods such as those with a low pass filter may be used for the purpose of the smoothing.

In step S106, the geometrical distance is calculated. Step S106 will be called a geometrical distance calculating step hereinafter. The optical path length acquired in step S103 and the smoothed refractive index acquired in step S105 are used to calculate the geometrical distance L of the optical path difference between the reference beam and the test beam with Expression (11).

$$L_i = \frac{OPL_{1i}}{n_{1i}^{Ave}} \quad (11)$$

The ith measurement loop completes up to this point, and step S103 of the (i+1)th measurement loop starts. The measurement is repeated in the analyzer 30 until a user instructs to finish it. If instructed to finish, the measurement ends in step S107.

Figure 3:
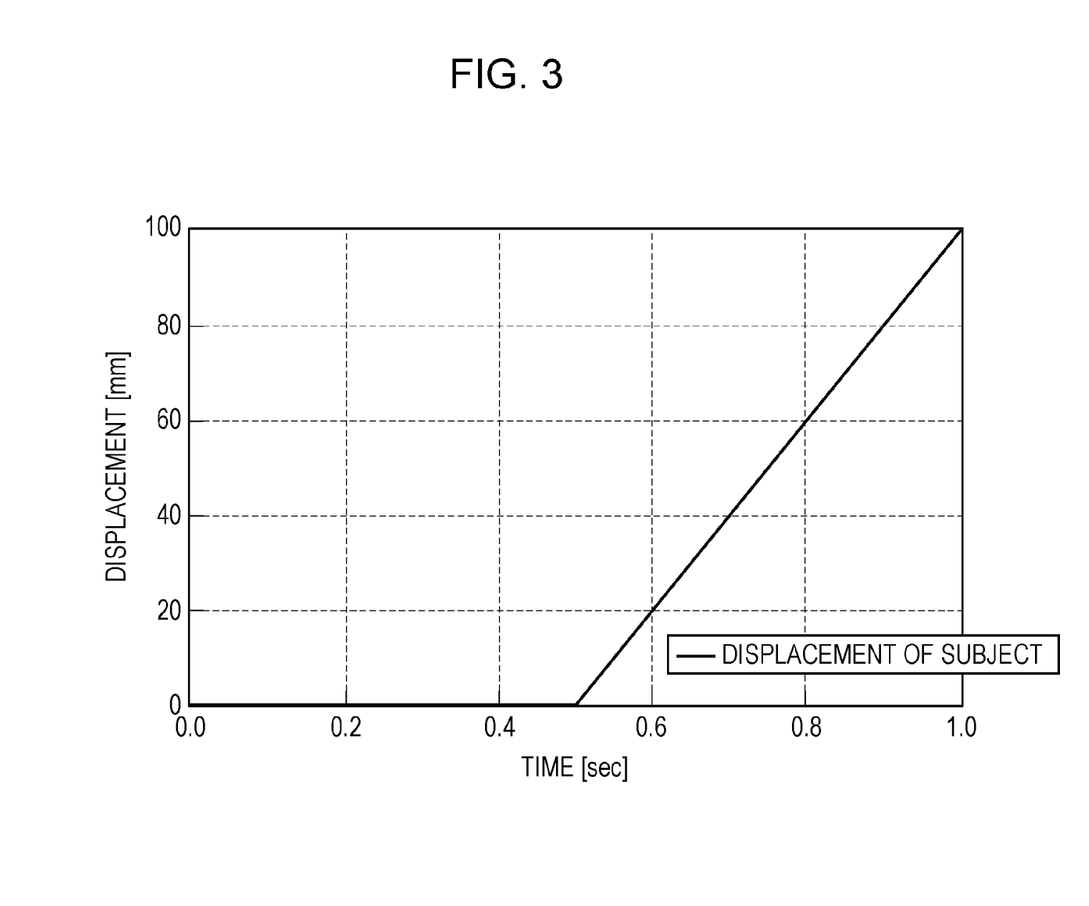
FIG. 3 illustrates a position characteristic of an object.
Figure 4A:
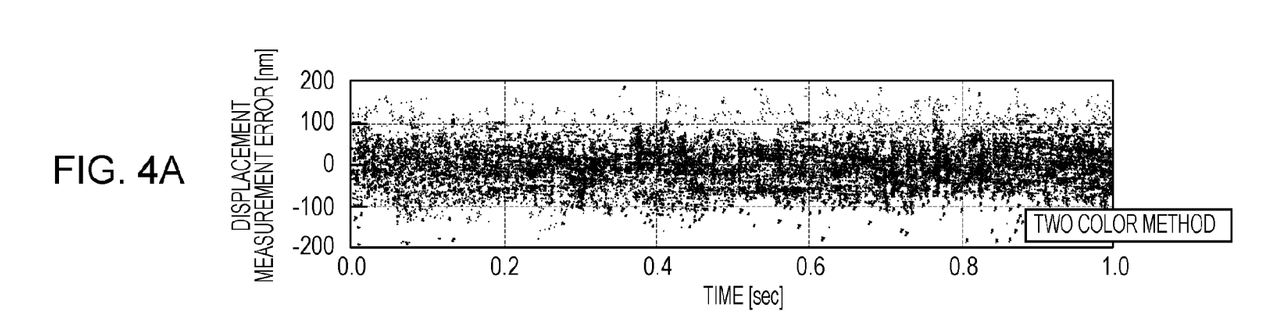
FIGS. 4A to 4C illustrate comparison in length measurement errors between methods in the past and the present invention.
Figure 4B:
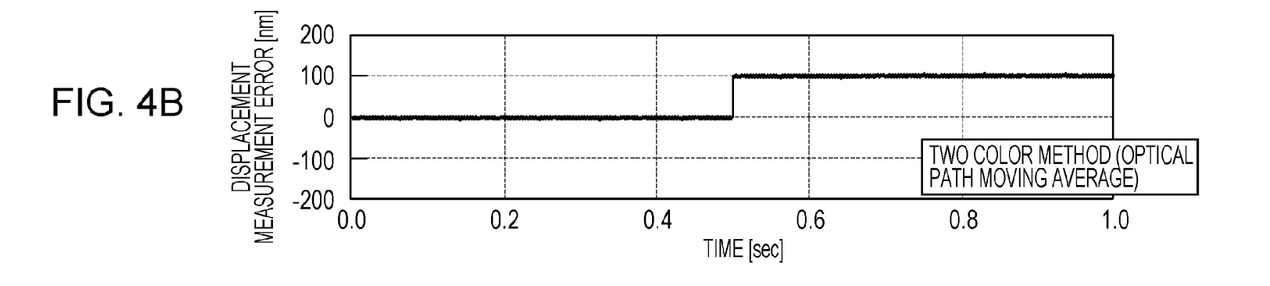
Figure 4C:
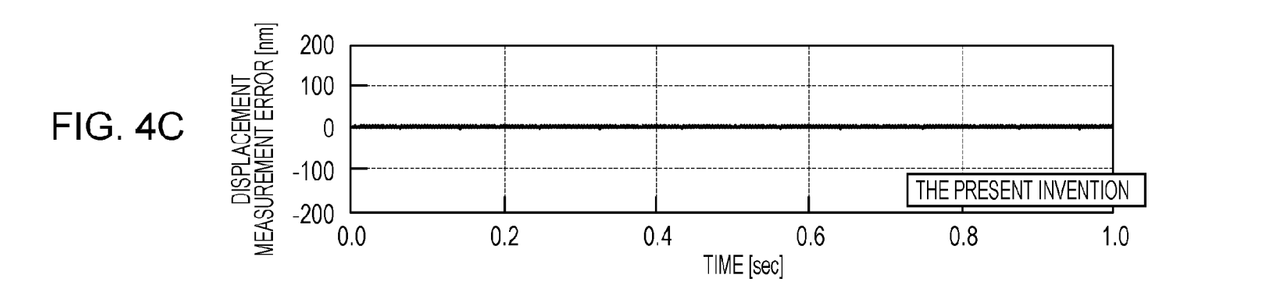

The advantages of the present invention will be described with reference to simulation results. FIG. 3 illustrates time changes at the position of an object and assumes a condition that the object stays still from the time 0 to 0.5 second and moves from the time 0.5 second at 200 mm/sec. FIGS. 4A to 4C illustrate a comparison of measurement errors occurring in three measurements of the Two-Color method. In FIGS. 4A and 4B, the conventional Two-Color method implemented; on the other hand, in FIG. 4C, implementing optical-path-length moving average in accordance with the present invention is illustrated. In the measurement by the Two-Color method illustrated in FIG. 4A, the measurement variations are amplified by the A coefficient, and the effective resolution decreases. On the other hand, when moving average is performed on optical path lengths according to a technology in the past illustrated in FIG. 4B, the variations decrease, but the optical-path-length moving average also reduces the response time, causing a measurement error (100 nm in this example) when the object is driven. In the measurement by the present invention illustrated in FIG. 4C, moving average is only performed on an refractive index component having a late change. This may prevent the decrease of the resolution in the Two-Color method without loss of the response time.

Second Embodiment

Figure 5:
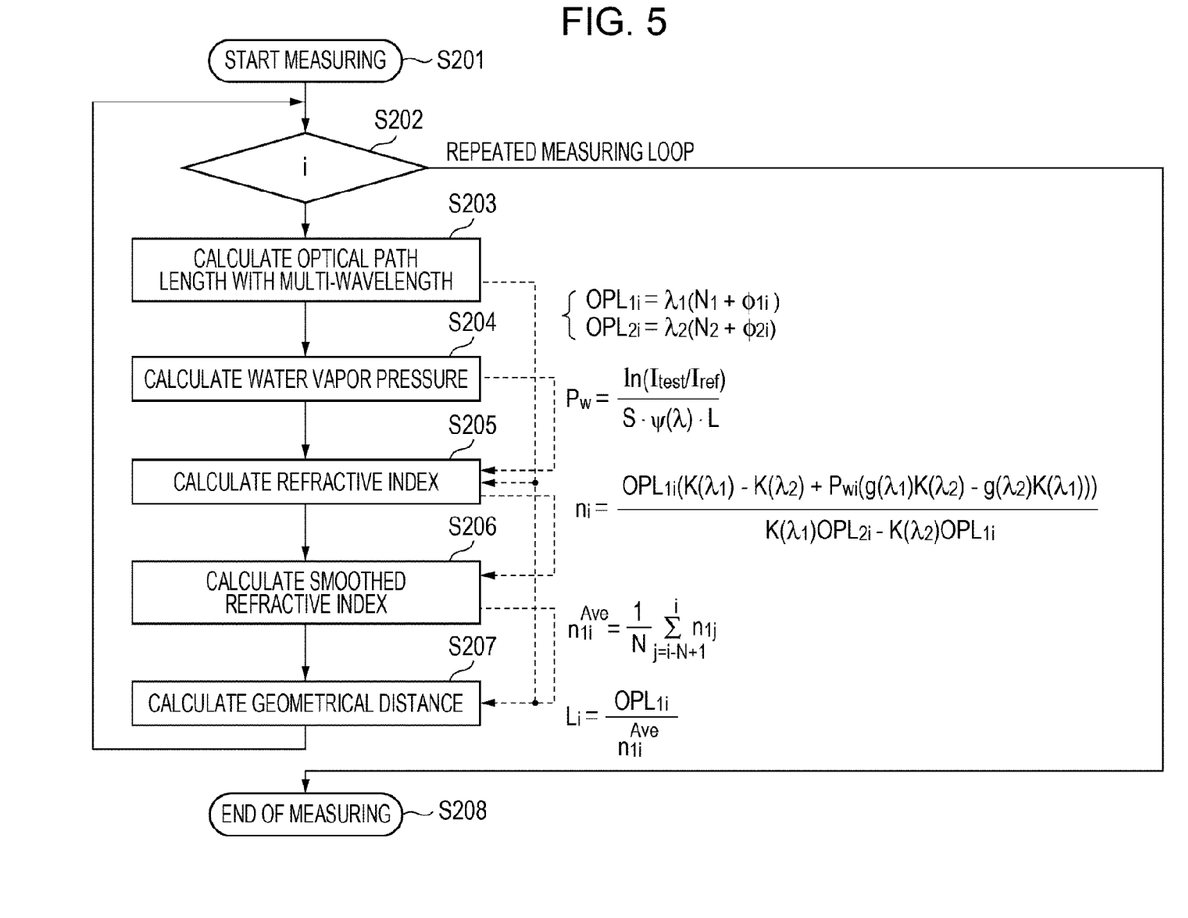
FIG. 5 is a flowchart of an interferometric method according to a second embodiment.
Figure 6:
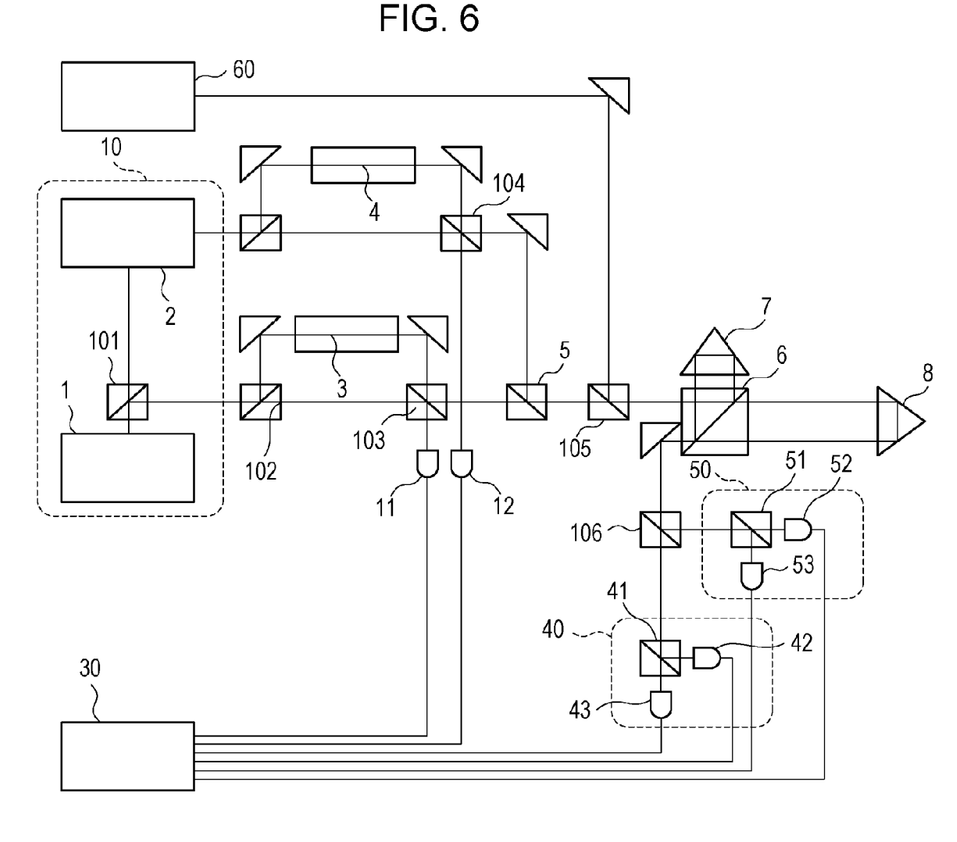
FIG. 6 illustrates an interferometer according to the second embodiment.

Next, with reference to FIG. 5 and FIG. 6, an interferometric method and interferometer according to a second embodiment will be described. FIG. 5 is a flowchart of an interferometric method according to a second embodiment. FIG. 6 illustrates the configuration of an interferometer according to the second embodiment.

According to the second embodiment, water vapor absorption is measured to measure the water vapor pressure on an optical axis of a test optical path. This allows application of the Two-Color method, which has been only applicable to dry air in the past, to a general environment and improvement with moving average of the resolution decreases by the Two-Color method.

Because the apparatus configuration in FIG. 6 in which the phase is detected by the Two-Color method is the same as the first embodiment, the description will be omitted. According to this embodiment, the light sources for measurement (measurement light sources) include a partial-pressure measurement light source 60 in addition to the multi-wavelength light source 10. The partial-pressure measurement light source 60 here is for the purpose of absorption measurement on water vapor pressure and has a wavelength matched with the water vapor absorption line. Selecting absorption lines having near-infrared wavelengths in the vicinity of wavelengths of 0.9 µm, 1.1 µm, and 1.4 µm allows the use of an inexpensive light source having a narrow-band spectrum, such as a distributed feedback laser diode (DFB-LD), as the measurement light source. The following description is limited to water vapor pressure measurement but the measurement by the same method is applicable to any gases whose partial pressure may be measured by using absorption.

A beam emitted by the partial-pressure measurement light source 60 is multiplexed with the fundamental beam emitted by the multi-wavelength light source 10 for phase measurement by the dichroic mirror 105. The multiplexed beam launches on the PBS 6 and is divided into two beams in the PBS 6. The beam reflected by the PBS 6 is reflected by a reference surface 7 and launches on and is reflected again by the PBS 6. The beam having passed through the other PBS 6 is reflected by a test surface 8 and launches on and passes through the PBS 6 again. Hereinafter, the beam emitted from the partial-pressure measurement light source 60 and reflected by the reference surface 7 will be called a water vapor-pressure reference beam, and a beam reflected by the test surface 8 will be called a water vapor-pressure test beam.

The water vapor-pressure reference beam and water vapor-pressure test beam are split by the dichroic mirror 106 from the beam emitted from the multi-wavelength light source 10 and launch on a partial pressure detector 50. The partial pressure detector 50 includes a PBS 51, a water vapor-pressure amount-of-test beam detector 52, and a water vapor-pressure amount-of-reference-light detector 53. The water vapor-pressure reference beam of the beam launching on the partial pressure detector 50 is reflected by the PBS 51 and launches on the water vapor-pressure amount-of-reference-light detector 53. The water vapor-pressure test beam passes through the PBS 51 and launches on the water vapor-pressure amount-of-test beam detector 52. The intensity of the water vapor-pressure reference beam and water vapor-pressure test beam having launched on the detector are detected by the analyzer 30.

With reference to the flowchart in FIG. 5, an interferometric method to be performed within the analyzer 30 will be described below. The measurement is started in step S201, and advances to step S202. The repeated measurement loop is started in step S202 with a loop counting "i" until a user decides to end the measuring loop. Hereinafter, the subscript i refers to the measurement result of the ith measurement loop. (i is a positive integer) The measurement is repeated in the analyzer 30 until a user instructs to finish it. If instructed to finish, the measurement ends in step S208. Because steps S201 to S203 correspond to steps S101 to S103 of the first embodiment, the description will be omitted.

In step S204, on the basis of the quantities of light detection/measurement results by the water vapor-pressure amount-of-reference-light detector 53 and water vapor-pressure amount-of-test beam detector 52, a water vapor pressure $P_w$ of a test optical path is calculated. Hereinafter, step S204 will be called a water vapor-pressure calculating step. The absorbance $A(\lambda)$ of water vapor of a test optical path is described by Expression (12) where the absorption intensity of a water vapor pressure absorption line is S, a water vapor pressure is Pw, a spectrum form function of a water vapor absorption line is $\psi(\lambda)$, and the geometrical distance of the optical path difference between the water vapor-pressure test beam and the water vapor-pressure reference beam is L. In this case, it is assumed that the absorption intensity S and spectrum form function $\psi(\lambda)$ are known from a database, for example, and values are calculated in advance in accordance with the wavelength of a light source to be used for the water vapor pressure measurement.

$$A(\lambda) = P_w \cdot S \cdot \psi(\lambda) \cdot L \tag{12}$$

On the other hand, the relationship with the absorbance $A(\lambda)$ is described by Expression (13) where the quantity of light to be measured by the water vapor-pressure amount-of-reference-light detector 53 is $I_{ref}$, and the intensity measured by the water vapor-pressure amount-of-test beam detector 52 is $I_{test}$. From Expression (12), the water vapor pressure $P_W$ may be calculated with Expression (14).

$$A(\lambda) = -\ln(I_{test}/I_{ref}) \tag{13}$$

$$P_w = -\frac{\ln(I_{test}/I_{ref})}{S \cdot \psi(\lambda) \cdot L} \tag{14}$$

Expression (14) may require information on the geometrical distance L of the optical path difference between the water vapor-pressure test beam and the water vapor-pressure reference beam to calculate $P_w$. However, if the required precision for $P_w$ is strict, the information may be replaced with the optical path length $OPL_{1i}$ or $OPL_{2i}$. If the replacement with the optical path length is not allowed for the precision, the geometrical distance to be acquired in step S207, which will be described below, may be used to calculate again for higher precision.

In step S205, the optical path length calculated in step S203 and the water vapor pressure calculated in step S204 are used to calculate the refractive index of the air. When the air density term is D(P,T,x) and the water vapor wavelength dispersion is $g(\lambda)$, the refractive index of the air when water vapor exists is described by Expression (15).

$$n(\lambda, P, T, x, Pw) = 1 + K(\lambda) \cdot D(P,T,x) + g(\lambda) \cdot P_w \tag{15}$$

Removing the air density term D(P,T,x) from the optical path lengths $OPL_1$ and $OPL_2$ measured with the wavelength $\lambda_1$ of the fundamental beam and the wavelength $\lambda_2$ of the second harmonic beam, the geometrical distance $L_i$ of the optical path difference between the test beam and the reference beam is described by Expression (16).

$$L_i = \frac{K(\lambda_1)OPL_{2i} - K(\lambda_2)OPL_{1i}}{K(\lambda_1) - K(\lambda_2) + P_{wi}(g(\lambda_1)K(\lambda_2) - g(\lambda_2)K(\lambda_1))} \tag{16}$$

Thus, the refractive index of the fundamental beam may be calculated with Expression (17).

$$n_{1i} = \frac{OPL_{1i}}{L_i} \tag{17}$$

$$= \frac{OPL_{1i}(K(\lambda_1) - K(\lambda_2) + P_{wi}(g(\lambda_1)K(\lambda_2) - g(\lambda_2)K(\lambda_1)))}{K(\lambda_1)OPL_{2i} - K(\lambda_2)OPL_{1i}}$$

Because step S206 and steps after step S206 are substantially similar to steps S106 and S107 of the first embodiment, the descriptions will be omitted. The refractive-index smoothing step in step S206 corresponds to step S105 of the first embodiment. The geometrical distance calculating step in step S207 corresponds to step S106 of the first embodiment. According to this embodiment, the Two-Color method is applicable even in a general environment where water vapor exists in a test optical path. The application of a refractive index to the smoothing may improve the resolution of the Two-Color method without influencing the response characteristic of the length measurement.

The measurement is repeated in the analyzer 30 until a user instructs to finish it. If instructed to finish, the measurement ends in step S208.

Having described according to the aforementioned embodiments apparatuses which generate beams having two wavelengths from one light source, the multi-wavelength light source may be replaced by the use of light sources that emit different wavelengths.

According to the aforementioned embodiments, the type of interferometer is a linear interferometer having corner cubes for the reference surface 7 and test surface 8, and the PBS 6 and reference surface 7 are attached to a reference structure for length measurement. However, the present invention is not limited thereto. A plane mirror interferometer may be used in which mirrors are used as the reference surface and test surface. Alternatively, a differential plane mirror interferometer may be used. A general plane mirror interferometer has many common optical paths and has higher stability while causing more cyclic errors. On the other hand, a linear interferometer or differential plane mirror interferometer has many optical paths that are not common and has lower stability while causing fewer cyclic errors. For that reason, the interferometer to be used may be selected in accordance with the application and the required performance.

According to the aforementioned embodiments, the phase detection of interferometric measurement is based on a heterodyne method in which the test beam and the reference beam have different frequencies. However, a homodyne method with an equal frequency may be used instead. The detection based on a homodyne method may eliminate the necessity for the frequency shift unit 3 and second harmonic frequency-shift unit 4. However, for phase detection, a plurality of interference signals of known phase differences may be required to generate, which complicates the configuration of the interference signal detector 40.

Having described the embodiments of the present invention, the present invention is not limited to the embodiments nut may be changed and modified variously without departing from the spirit and scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-252472 filed Nov. 11, 2010, which is hereby incorporated by reference herein in its entirety.

What is claimed is:

1. A method of calculating a geometric distance of a test optical path on the basis of interfering a test beam reflected by a test surface and a reference beam reflected by a reference surface, the method comprising:
an optical-path-length calculating step of calculating an optical path length of the test optical paths by using the test beam and the reference beam each having a different wavelength;
a refractive-index calculating step of calculating a refractive index of the test optical path based on the optical path length of the test optical path calculated by the optical-path-length calculating step;
a smoothing step of smoothing a plurality of refractive indices acquired by repeating the optical-path-length calculating step and the refractive-index calculating step to calculate a smoothed refractive index; and
a geometrical distance calculating step of calculating the geometrical distance of the test optical path based on the smoothed refractive index calculated by the smoothing step.

2. The calculation method according to claim 1, wherein the test optical path is an optical path difference between the reference beam reflected by the reference surface and the test beam reflected by the test surface; and
wherein the geometrical distance of the optical path difference which changes with movement of the test surface is measured.

3. The calculation method according to claim 2, wherein the refractive-index calculating step calculates the refractive index by using the following expression $$n_{1i} = \frac{OPL_{1i}}{OPL_{1i} - \frac{K(\lambda_1) - 1}{K(\lambda_2) - K(\lambda_1)}(OPL_{2i} - OPL_{1i})}$$

where the ith optical path length in a first beam calculated by the optical-path-length calculating step is $OPL_{1i}$, the ith optical path length in a second beam having a different wavelength from the first beam is $OPL_{2i}$, and $K(\lambda)$ is a refractive index dispersion of air through which the test optical path is formed; and
the smoothing step calculates the smoothed refractive index by using the following expression:

$$n_{1i}^{Ave} = \frac{1}{N} \sum_{j=i-N+1}^{i} n_{1j}$$

where N represents a moving average deviation.

4. The calculation method according to claim 3, wherein the wavelength of the second beam is the half wavelength of the first beam.

5. The calculation method according to claim 3, wherein the number of data points for averaging N is changed in accordance with the moving speed of the test surface in the smoothing step.

6. The calculation method according to claim 2, wherein the refractive-index calculating step calculates the refractive index by using the following expression $$n_{1i} = \frac{OPL_{1i}(K(\lambda_1) - K(\lambda_2)) + P_{wi}(g(\lambda_1)K(\lambda_2) - g(\lambda_2)K(\lambda_1))}{K(\lambda_1)OPL_{2i} - K(\lambda_2)OPL_{1i}}$$

where the ith optical path length in a first beam calculated by the optical-path-length calculating step is $OPL_{1i}$, the ith optical path length in a second beam having a different wavelength from the first beam is $OPL_{2i}$, Pw is a water vapor pressure, $K(\lambda)$ is a refractive index dispersion of dry air and $g(\lambda)$ is a wavelength dispersion of water vapor through which the test optical path is formed; and
the smoothing step calculates the smoothed refractive index by using the following expression:

$$n_{1i}^{Ave} = \frac{1}{N} \sum_{j=i-N+1}^{i} n_{1j}$$

where N represents a number of data points for averaging.

7. An interferometer which calculates the geometrical distance of a test optical path on the basis of interfering a test beam reflected by a test surface and a reference beam reflected by a reference surface, the apparatus comprising:
a multi-wavelength light source which emits plural light beams each having a different wavelength;
a signal detector which detects an interfering beam having interference between a test beam resulting from the reflection of a beam emitted from the multi-wavelength light source by the test surface and a reference beam reflected by the reference surface;
an operating unit which performs an optical-path-length calculation to calculates an optical path length of the test optical paths by using the interfering beam of light beams having different wavelengths detected by the signal detector, performs a refractive-index calculation to calculates a refractive index of the test optical path on the basis of the calculated optical path length of the test optical path, smoothes a plurality of refractive indices acquired by repeating the optical-path-length calculation and the refractive-index calculation to calculate a smoothed refractive index, and calculates the geometrical distance of the test optical path on the basis of the calculated smoothed refractive index.

8. The interferometer according to claim 7, wherein the test optical path is an optical path difference between the reference beam reflected by the reference surface and the test beam reflected by the test surface; and
wherein the geometrical distance of the optical path difference which changes with movement of the test surface is measured.

9. The interferometer according to claim 7, comprising:
a partial-pressure measurement light source which emits a beam for measuring a partial pressure of the test optical path; and
a partial pressure detector which detects a water vapor-pressure reference beam emitted from the partial-pressure measurement light source and reflected by the reference surface and a water vapor-pressure test beam which is reflected by the test surface and passes through the test optical path, wherein the operating unit calculates the optical path length on the basis of the beam detected by the signal detector, calculates a water vapor pressure on the basis of the beam detected by the partial pressure detector, and calculates the refractive index of the test optical path on the basis of the calculated optical path length and the calculated water vapor pressure.

* * * * *